(12) United States Patent
Bryant et al.

(10) Patent No.: US 9,798,018 B2
(45) Date of Patent: Oct. 24, 2017

(54) LUMINESCENT BEAM STOP

(71) Applicant: The Regents of the University of California, Oakland, CA (US)

(72) Inventors: Diane Bryant, Alameda, CA (US); Simon A. Morton, Berkeley, CA (US)

(73) Assignee: The Regents of The University of California, Oakland, CA (US)

( * ) Notice: Subject to any disclaimer, the term of this patent is extended or adjusted under 35 U.S.C. 154(b) by 45 days.

(21) Appl. No.: 15/069,590

(22) Filed: Mar. 14, 2016

(65) Prior Publication Data

US 2016/0291168 A1    Oct. 6, 2016

Related U.S. Application Data

(60) Provisional application No. 62/141,790, filed on Apr. 1, 2015.

(51) Int. Cl.
| | |
|---|---|
| *G01T 1/20* | (2006.01) |
| *G21H 3/02* | (2006.01) |
| *G21K 1/10* | (2006.01) |

(52) U.S. Cl.
CPC ............ *G01T 1/201* (2013.01); *G01T 1/2006* (2013.01); *G21H 3/02* (2013.01); *G21K 1/10* (2013.01)

(58) Field of Classification Search
CPC .............................. G01T 1/201; G01T 1/2006
See application file for complete search history.

(56) References Cited

U.S. PATENT DOCUMENTS

| | | |
|---|---|---|
| 6,493,493 B1 | 12/2002 | Crafts |
| 6,621,967 B2 | 9/2003 | Crafts |
| 7,953,308 B2 | 5/2011 | Fomitchov |
| 8,755,654 B1 | 6/2014 | Danley et al. |
| 9,085,047 B2 | 7/2015 | Danley et al. |
| 2007/0181815 A1* | 8/2007 | Ebstein ............... G01T 1/02 250/370.11 |
| 2015/0233804 A1* | 8/2015 | Meisberger ......... G01N 23/201 378/53 |

OTHER PUBLICATIONS

Shenglan Xu et al., "Micro-Crystallography Developments at GM/CA-CAT at the APS," AIP Conf. Proc. 1234, 905 (2010).
Paul J. Ellis, et al., "Beamstop with integrated X-ray sensor," J. Synchrotron Rad. (2003). 10, 287-288.
D. Bryant, et al., "A Micromanufactured Diode Beamstop," SRI 2015, Jul. 8, 2015.

(Continued)

*Primary Examiner* — Casey Bryant
(74) *Attorney, Agent, or Firm* — Lawrence Berkeley National Laboratory

(57) ABSTRACT

This disclosure provides systems, methods, and apparatus related to beam stops. In one aspect, a device comprises a luminescent material, a beam stop plate, and an optical fiber. The luminescent material is a parallelepiped having a first side and a second side that are squares and having a third side that is a rectangle or a square. The first side and the second side are perpendicular to the third side. The beam stop plate is attached to the first side of the luminescent material. The optical fiber has a first end and a second end, with the first end of the optical fiber attached to the third side of the luminescent material.

20 Claims, 11 Drawing Sheets

(56) References Cited

OTHER PUBLICATIONS

D. Bryant, et al., "Gold, Glass, and Garnets: A Micromanufactured Diode Beamstop," Acta Cryst. (2014). A70, C1804.

Clement E. Blanchet, et al., "A small and robust active beamstop for scattering experiments on high-brilliance undulator beamlines," J. Synchrotron Rad. (2015). 22, 461-464.

Ulrich Englich, et al., "A new beam stop for microfocus X-ray capillary beams," Nuclear Instruments and Methods in Physics Research A 649 (2011) 101-103.

D. Bryant, et al., "Micromanufacturing Processes for Beamline Improvement," American Crystallographic Association Annual Meeting, May 24, 2014.

* cited by examiner

LUMINESCENT BEAM STOP

RELATED APPLICATIONS

This application claims priority to U.S. Provisional Patent Application Ser. No. 62/141,790, filed Apr. 1, 2015, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

BACKGROUND

Many experimental techniques (e.g., small-angle x-ray scattering) utilize highly concentrated beams of electromagnetic radiation (e.g., x-rays) directed at a sample. When x-rays interact with the sample, a portion of the x-rays are scattered or diffracted by the sample (e.g., x-rays are diffracted in protein crystallography). These scattered or diffracted x-rays travel to a detector (e.g., a Pilatus detector or a silicon pixel detector). Experimenters use the pattern of scattered or diffracted x-rays captured by the detector to obtain information about the sample.

Much of the x-ray beam, however, passes through the sample without interacting with the sample. This portion of the x-ray beam also travels toward the detector. If this unscattered portion of the beam is allowed to interact with the detector, it may overwhelm and/or slowly damage the detector and the scattered x-rays may not be observable. In order to prevent this, a beam stop can be placed between the sample and the detector to prevent the unscattered x-rays from hitting the detector. In order to be fully effective and useful, a beam stop should be as small as possible to prevent obstruction of the scattered x-rays and dense enough to absorb the unscattered x-rays. FIG. 1 shows an example of a schematic illustration of a setup at a beamline (e.g., at a synchrotron light source), including a sample, a detector, and a beam stop.

The unscattered portion of the x-ray beam, however, does carry information about the intensity, size, and position of the x-ray beam. If the unscattered x-rays could be characterized, in real time, during an experiment, such information potentially would be useful to experimenters.

SUMMARY

One innovative aspect of the subject matter described in this disclosure can be implemented in a device that includes a luminescent material (e.g., cerium-doped yttrium aluminum garnet (YAG)) and an optical fiber bonded to the luminescent material. The luminescent material emits light (e.g., scintillates) when the x-ray beam impinges on it and can provide information about the x-ray beam. The light can travel to the other end of the optical fiber to a light measuring device (e.g., a photodiode) which is in contact with the optical fiber. In some implementations, the device is highly responsive (e.g., nearly instantaneous response to changes in beam intensity), and real-time information about the x-ray beam can be obtained with no disruption to an experiment.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Some embodiments described herein refer to beam stops for x-rays and small angle x-ray scattering. The device and methods described herein also may be used in other experiments utilizing the scattering of or the diffraction of electromagnetic radiation.

Figure 1:
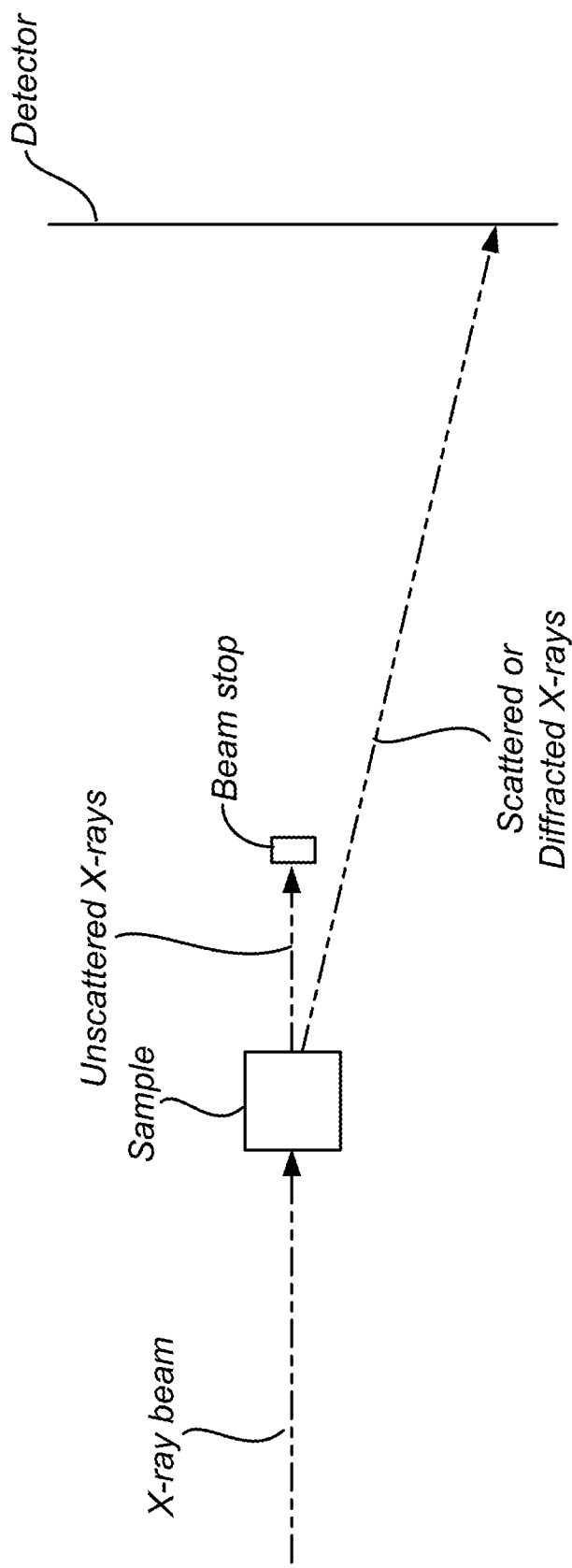
FIG. 1 shows an example of a schematic illustration of a setup at a beamline.
Figure 2A:
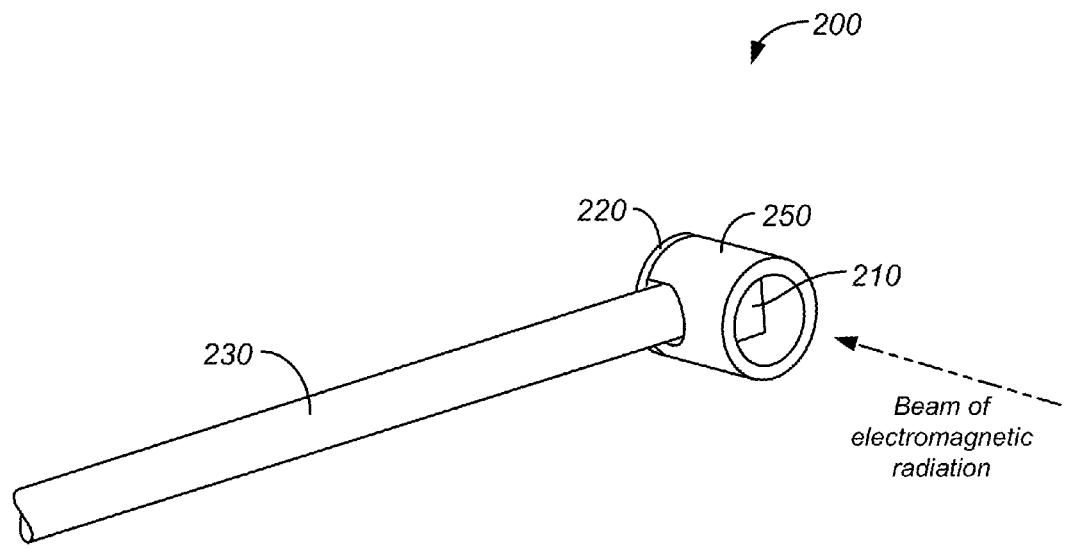
FIG. 2A and 2B show examples of illustrations of a luminescent beam stop.
Figure 2B:
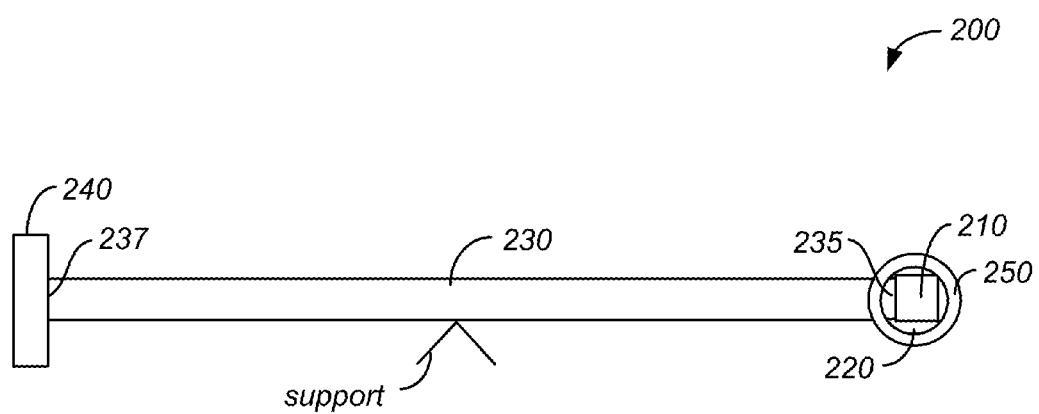

FIG. 2A and 2B show examples of illustrations of a luminescent beam stop. FIG. 2A shows an example of an isometric illustration of a luminescent beam stop. FIG. 2B shows an example of an illustration of a luminescent beam stop from a vantage point of an x-ray beam (e.g., generated at a synchrotron light source or generated by an x-ray generating device) that would impinge on a luminescent material.

As shown in FIGS. 2A and 2B, a luminescent beam stop 200 includes a luminescent material 210, a beam stop plate 220, and an optical fiber (i.e., a fiber optic) 230. In some embodiments, the luminescent beam stop 200 further includes a light sensing device 240 and a hollow sleeve 250. The beam stop plate 220 is attached to or bonded to a side of the luminescent material 210. A first end 235 of the optical fiber 230 is attached to or bonded to a different side of the luminescent material 210. The side of the luminescent material 210 having the beam stop plate 220 attached thereto and the side of the luminescent material 210 having the optical fiber 230 attached thereto are perpendicular or substantially perpendicular (e.g., within a few degrees of being perpendicular) to one another. A second end 237 of the optical fiber 230 is attached to the light sensing device 240. Larger illustrations of the luminescent material 210, the beam stop plate 220, and the hollow sleeve 250 are shown in FIGS. 3, 4A, 4B, 4C, and 5.

The luminescent material 210 and beam stop plate 220 of the luminescent beam stop 200 can be positioned between a sample and a detector in a beamline experiment, with the beam of electromagnetic radiation that passes through a sample with no scattering impinging on the luminescent material 210 and then the beam stop plate 220. This portion of the radiation (i.e., the unscattered electromagnetic radiation) causes the luminescent material 210 to generate light (e.g., by scintillation or fluorescence). The light generated by the luminescent material 210 is transmitted to the light sensing device 240 though the optical fiber 230. In some embodiments, the luminescent material 210 and beam stop plate 220 are positioned about 1 centimeter (cm) to 6 cm, or about 2 cm to 3 cm, from the sample. In some embodiments, the luminescent material 210 and beam stop plate 220 are positioned about 1 cm to 15 meters, about 10 meters to 15 meters, or greater than about 10 meters, from the sample.

The luminescent material 210 will generally generate more light the more intense the beam of electromagnetic radiation is. Thus, the luminescent beam stop 200 allows for the determination of the intensity of the electromagnetic radiation or the alignment of the luminescent material 210 and beam stop plate 220 with the beam of electromagnetic radiation. Generally, the dimensions of the luminescent material 210 are specified so that the entire beam of electromagnetic radiation impinges on the luminescent material. If the beam is 100 microns by 100 microns, the dimensions of the side of the luminescent material on which beam impinges may be about 500 microns by 500 microns, for example. Having the dimensions of the luminescent material larger than the cross-sectional dimensions of the beam aid in ensuring that the entire beam impinges on the luminescent material.

The beam of electromagnetic radiation that impinges on the sample and passes through a sample with no scattering may have a square cross section with dimensions of about 50 microns to 500 microns by about 50 microns to 500 microns. For example, at some beamlines, the beam has a square cross section having dimensions of about 100 microns by about 100 microns. The beam of electromagnetic radiation can also be collimated to have different shapes and dimensions. For example, at some beamlines, the beam may have an elliptical or a circular cross section, with a dimension (e.g., a radius of a circle or a major axis of an ellipse) of the beam being about 2 microns to 200 microns.

Figure 3:
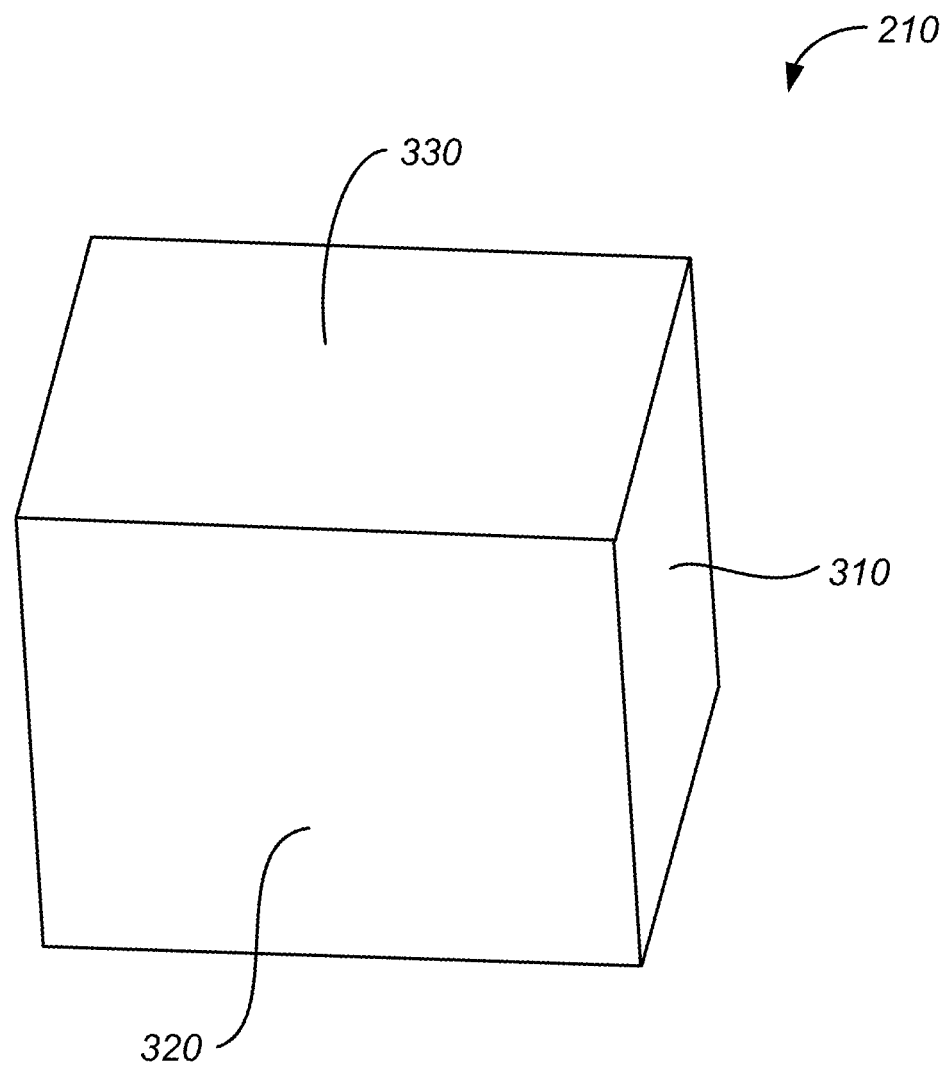
FIG. 3 shows an example of an illustration of a luminescent material.

FIG. 3 shows an example of an illustration of a luminescent material. A luminescent material is a material that emits light not resulting from heat or the temperature of the material. Scintillation is a type of luminescence in which a material (e.g., a transparent material) emits a flash of light due to the passage of a particle (e.g., an electron, an alpha particle, an ion, or a high-energy photon) in the material. Photoluminescence is another type of luminescence and is the result of absorption of photons. Fluorescence and phosphorescence are types of photoluminescence.

In some embodiments, the luminescent material 210 shown in FIG. 3 has a shape of a parallelepiped having a first side 310 and a second side (not shown) that are squares and having a third side 320 that is a rectangle. A parallelepiped is a three-dimensional object formed by six parallelograms. The fourth side 330, the fifth side (not shown), and the sixth side (not shown) are also rectangles. The first side 310 and the second side are perpendicular to the third side 320. Stated in a different manner, the luminescent material may have a square shaped cross-section including a first square side and a second square side. The third side is rectangular and is perpendicular to the first square side and the second square side.

The luminescent material may also have a different shape. For example, in some embodiments, the luminescent material may be a cube. Is some embodiments, the luminescent material may be a rectangular parallelepiped. A rectangular parallelepiped is a parallelepiped of which all faces are rectangular.

In some embodiments, the luminescent material comprises a scintillating material or a fluorescing material. In some embodiments, the luminescent material comprises a material selected from a group consisting of yttrium aluminum garnet ($Y_3Al_5O_{12}$, YAG), cerium-doped YAG, lead tungstate ($PbWO_4$), cadmium tungstate ($CdWO_4$), and diamond (i.e., the allotrope of carbon). The luminescent material used depends on the energies of the electromagnetic radiation at the beam line. For example, cerium-doped YAG emits light in response to electromagnetic radiation when the electromagnetic radiation has an energy of about 6000 eV to 16,000 eV.

In some embodiments, the first side and the second side of the luminescent material are about 250 microns to 1 millimeter (mm) by about 250 microns to 1 mm, and the third side of the luminescent material is about 250 microns to 1 mm by about 250 microns to 1 mm. That is, the dimensions of the luminescent material may be about 250 microns to 1 mm by about 250 microns to 1 mm by about 250 microns to 1 mm. In some embodiments, the first side of the luminescent material 210 is about 500 microns by about 500 microns, and the third side of the luminescent material 210 is about 500 microns by 600 microns. That is, the dimensions of the luminescent material may be about 500 microns by about 500 microns by about 600 microns. In some embodiments, the dimensions of the luminescent material are about 500 microns by about 500 microns by about 500 microns. In some embodiments, the dimensions of the luminescent material are about 600 microns by about 600 microns by about 1 mm.

In some embodiments, some surfaces of the luminescent material 210 are coated with a reflective material. For example, the sides of the luminescent material 210 parallel to the direction of the electromagnetic beam propagation when the luminescent beam stop is being used may be coated with a reflective material. The area where the optical fiber 230 is attached to the side of the luminescent material 210 would not be coated with a reflective material. In some embodiments, the side of the luminescent material 210 on which the beam of electromagnetic radiation impinges is not coated with a reflective material. For example, the reflective material may be a white paint, a silver paint (e.g., a paint containing silver particles), or a gold paint (e.g., a paint containing gold particles). The reflective material may further increase the intensity of the light transmitted to the optical fiber.

In some embodiments, the side of the luminescent material 210 on which the beam of electromagnetic radiation impinges is coated with a reflective material. For example, the reflective material may comprise aluminum or an aluminum paint (e.g., a paint containing aluminum particles). Such a coating would aid in preventing external light (e.g., light not generated by the luminescent material) from being transmitted to the optical fiber. Such a coating may also increase the intensity of light transmitted to the optical fiber.

Figure 4A:
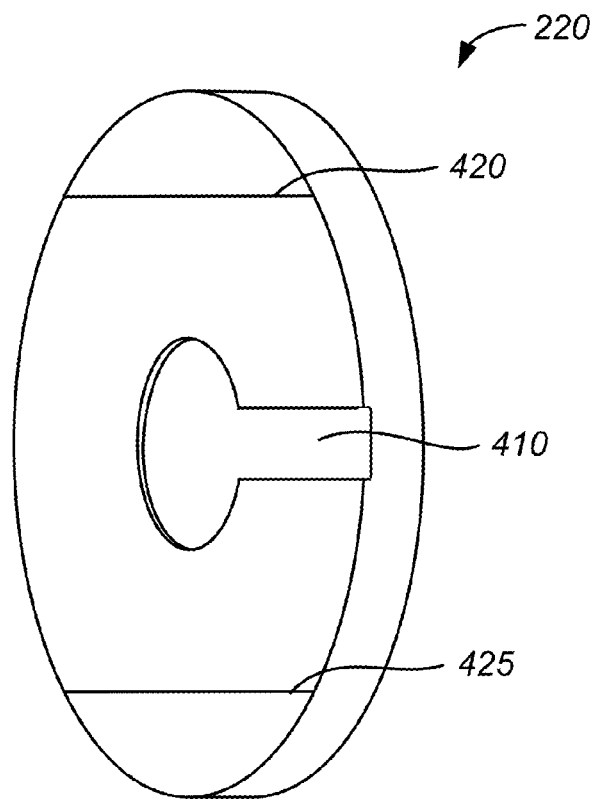
FIGS. 4A and 4B show examples of illustrations of a beam stop plate.
Figure 4B:
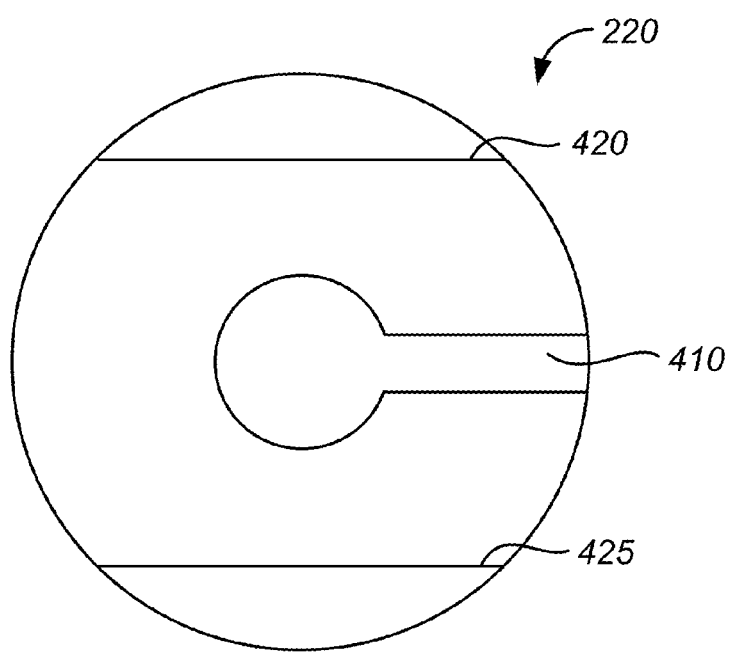

FIGS. 4A and 4B show examples of illustrations of a beam stop plate. The beam stop plate 220 shown in FIGS. 4A and 4B is attached to the first side of the luminescent material 210. In some embodiments, the beam stop plate is attached to the luminescent material with an adhesive. For example, the adhesive may be a cyanoacrylate adhesive, such as Permabond 910 (Permabond LLC, Pottstown, Pa.).

In some embodiments, the beam stop plate 220 comprises a material that is thick enough and dense enough to block the electromagnetic radiation transmitted through a sample and the luminescent material 210 with no scattering from impinging on the detector. In some embodiments, the beam stop plate comprises a metal selected from a group consisting of silver, gold, tantalum, tungsten, lead, platinum, and molybdenum. In some embodiments, the beam stop plate is about 100 microns to 1 mm thick, or about 200 microns thick. In some embodiments, the beam stop plate has circular shape and a diameter of about 250 microns to 2 mm, about 1.25 mm, or about 1 mm.

In some embodiments, the beam stop plate 220 includes a depression 410 defined in one surface of the beam stop plate 220. In some embodiments, the depression 410 includes a center depression or well defined at or near a center of the beam stop plate 220 and a channel depression or trench that extends to an edge of the beam stop plate 220. In some embodiments, the center depression and the channel depression are connected. In some embodiments, the side of the beam stop plate 220 including the depression 410 is attached to the side of the luminescent material 210. In some embodiments, the depression 410 aids in wicking an adhesive used to attach the beam stop plate 220 to the luminescent material 210 away from the sides of the luminescent material 210 not in contact with the beam stop plate 220.

In some embodiments, the beam stop plate 220 includes lines 420 and 425. For example, the lines 420 and 425 may be scored or otherwise marked on the surface of the beam stop plate 220. The lines 420 and 425 may aid in aligning the luminescent material 210 on the beam stop plate 220. For example, the luminescent material 210 may be positioned on the beam stop plate 220 so that two sides of the luminescent material 210 are parallel with the lines 420 and 425 before attaching the luminescent material 210 to the beam stop plate 220

Figure 4C:
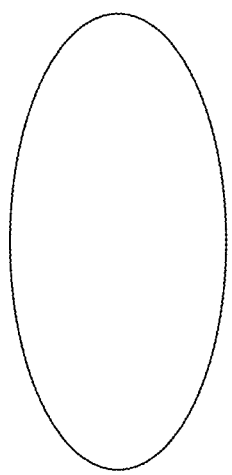
FIG. 4C shows an example of an illustration of a beam stop plate.

In some embodiments, the beam stop plate has an oval shape or elliptical shape with an about 250 micron to 2 mm short axis and an about 300 micron to 3 mm long axis, as shown in FIG. 4C. In some embodiments, the beam stop plate has an oval shape with an about 1.25 mm short axis and an about 2.5 mm long axis. In some embodiments, the beam stop plate 220 has dimensions such that it covers the entire area of the side of the luminescent material to which is it attached.

In some embodiments, the optical fiber 230 comprises a single optical fiber or comprises only one optical fiber. In some embodiments, the optical fiber 230 consists of a single optical fiber or consists of only one optical fiber. In some embodiments, the optical fiber 230 has a circular cross section and has a diameter of about 200 microns to 600 microns, about 350 microns to 450 microns, or about 400 microns. In some embodiments, the dimensions of the end 235 of the optical fiber 230 are specified so that the entire area of the end 235 of the optical fiber 230 is attached to the luminescent material 210. For example, if the luminescent material 210 has dimensions of about 500 microns by 500 microns by 500 microns, the diameter of the optical fiber would be about 500 microns or less than about 500 microns.

In some embodiments, the optical fiber comprises a multi-mode optical fiber. A multi-mode optical fiber has a larger core diameter than a single-mode optical fiber. Multi-mode optical fibers also generally have higher light-gathering capacities than single-mode fibers. In some embodiments, optical fiber can transmit light having wavelengths of about 400 nanometers to 700 nanometers.

In some embodiments, the optical fiber is attached to the luminescent material with an optical adhesive. An optical adhesive can join two optical components and allow for light transmission between the two components with minimal light loss. Optical adhesives include clear, colorless, liquid photopolymers that cure when exposed to ultraviolet light. Two examples of optical adhesives are Norland Optical Adhesive 61 and Norland Optical Adhesive 63 (Norland Products, Cranbury, N.J.).

In some embodiments, the optical fiber 230 has a length of about 10 cm to 2 meters, about 0.5 meters to 2 meters, or about 1 meter to 2 meters. At some beamlines, the optical fiber may be positioned in a horizontal plane. A plane is said to be horizontal at a given point if it is perpendicular to the gradient of the gravity field at that point. In some embodiments, the optical fiber 230 may be supported at a distance of about 5 cm to 25 cm, or about 10 cm to 13 cm, from the luminescent material 210 and beam stop plate 220. In this configuration, the stiffness of the optical fiber 230 supports the luminescent material 210 and beam stop plate 220 as a cantilever support. With the optical fiber 230 supported at such a distance from the luminescent material 210 and beam stop plate 220, scattered electromagnetic radiation may interact with the optical fiber 230 before being recorded by a detector. The small diameter of the optical fiber 230 would not block very much of the scattered x-rays from reaching the detector. Further, because optical fiber 230 is amorphous, the optical fiber may not substantially further scatter x-rays.

Figure 5:
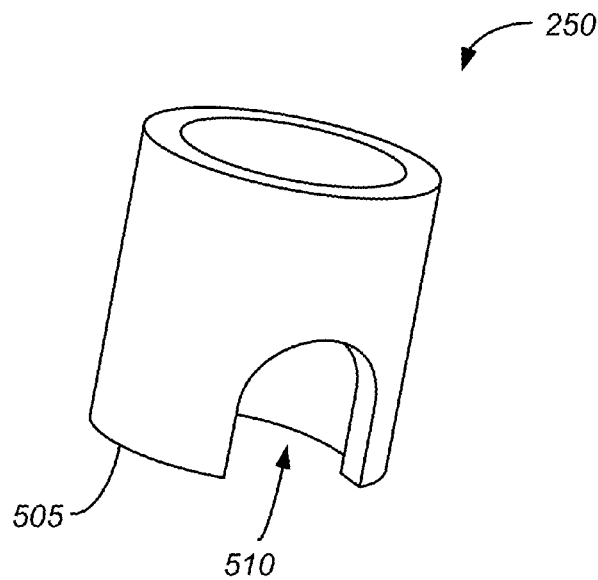
FIG. 5 shows an example of an illustration of a hollow sleeve.

In some embodiments, the luminescent beam stop 200 includes a hollow sleeve 250. FIG. 5 shows an example of an illustration of a hollow sleeve. An end 505 of the hollow sleeve 250 is attached to the beam stop plate 220, the same side of the beam stop plate attached to the luminescent material 210. The hollow sleeve 250 surrounds the luminescent material 210. The hollow sleeve 250 includes a cutout 510 to allow the optical fiber 230 to contact the luminescent material 210.

In some embodiments, the hollow sleeve 250 comprises a material that is thick enough and dense enough to block electromagnetic radiation scattered by the luminescent material. In some embodiments, the hollow sleeve 250 comprises a metal selected from a group consisting of silver, gold, tungsten, and tantalum. In some embodiments, the hollow sleeve 250 and the beam stop plate 220 comprise the same metal. In some embodiments, the hollow sleeve 250 and the beam stop plate 220 comprise different metals. In some embodiments, the end 505 of the hollow sleeve 250 is attached to the beam stop plate 220 with an adhesive. For example, the adhesive may be a cyanoacrylate adhesive.

In some embodiments, a wall of the hollow sleeve is about 100 microns to 300 microns thick, or about 200 microns thick. In some embodiments, the hollow sleeve is a hollow cylinder. In some embodiments, when the hollow sleeve is a hollow cylinder, an outer diameter of the hollow sleeve is about 250 microns to 2 mm, about 1.25 mm, or about 1 mm. In some embodiments, the beam stop plate has a circular shape, the hollow sleeve is a hollow cylinder, and an outer diameter of the hollow cylinder is the same as the diameter of the beam stop plate. In some embodiments, a height of the hollow sleeve is about 250 microns to 1 mm. In some embodiments, a height of the hollow sleeve is the same as or greater than the length of the side of the luminescent material to which the fiber optic is attached. That is, the hollow sleeve may surround the luminescent material so that only a single face of the luminescent material is visible.

The hollow sleeve may aid in preventing electromagnetic radiation (e.g., x-rays) scattered by the luminescent material from impinging on the detector. Further, the hollow sleeve may increase the intensity of the light that is transmitted to the optical fiber. For example, the interior surface of the hollow sleeve may be reflective. More light generated by the luminescent material would be transmitted to the optical fiber by the light being reflected by the interior surfaces of the hollow sleeve to the optical fiber.

When the hollow sleeve is a hollow cylinder and when the luminescent material is shaped as a parallelepiped, an open volume exists between the hollow sleeve and the luminescent material. In some embodiments, the surfaces of the hollow sleeve and/or the luminescent material defining the open volume between the hollow sleeve and the luminescent material are coated with a reflective material. For example, the reflective material may be a white paint, a silver paint, or a gold paint. The reflective material may further increase the intensity of the light transmitted to the optical fiber.

In some embodiments, as shown in FIG. 2B, the light sensing device 240 is attached to or connected to the second end 237 of the optical fiber 230. The light sensing device 240 may be able to convert the light signal of the luminescent material 210 to an electrical signal that can be recorded. In some embodiments, the light sensing device 240 includes a photodiode or a photodarlington device. A photodiode is a semiconductor device that converts light into current, and generates the current when photons are absorbed in the photodiode. The current generated by the photodiode can be recorded with an instrument, such as an ammeter or a picoammeter, for example.

Figure 6:
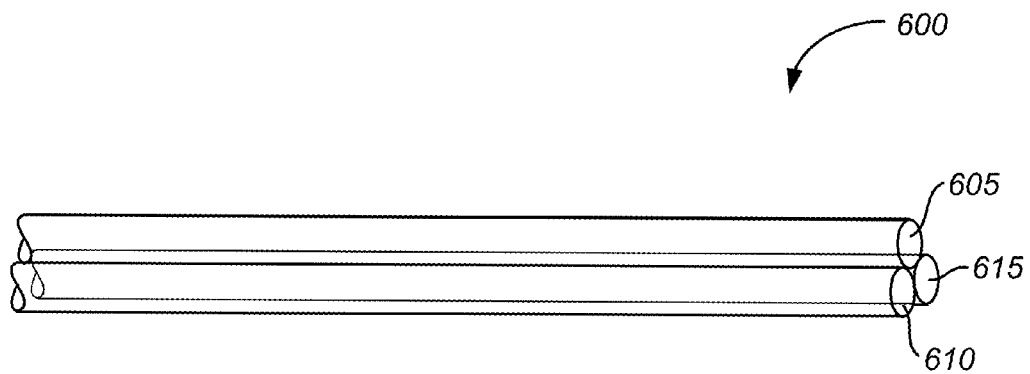
FIG. 6 shows an example of an illustration of a bundle of optical fibers.

In some embodiments, the optical fiber attached to a side of the luminescent material is one of a plurality of optical fibers, one of three optical fibers, or one of four optical fibers comprising a bundle of optical fibers. Alternatively, in some embodiments, the optical fiber 230 shown in FIGS. 2A and 2B is replaced with a bundle of optical fibers including a plurality of optical fibers, three optical fibers, or four optical fibers. FIG. 6 shows an example of an illustration of a bundle of optical fibers. The bundle of optical fibers 600 shown in FIG. 6 includes a first optical fiber 605, a second optical fiber 610, and a third optical fiber 615. In some embodiments, each optical fiber in the bundle of optical fibers has a circular cross section having a diameter of about 100 microns to 300 microns, about 220 microns, or about 200 microns. In some embodiments, the bundle of optical fibers has a length of about 10 centimeters to 2 meters, about 0.5 meters to 2 meters, or about 1 meter to 2 meters. In some embodiments, the optical fibers in the bundle of optical fibers are bonded to each other with an adhesive. For example, the adhesive may be a cyanoacrylate adhesive. In some embodiments, the bundle of optical fibers has a higher stiffness than a single optical fiber and is better able to support the luminescent material 210 and beam stop plate 220 when the bundle of optical fibers is positioned in a horizontal plane.

Figure 7:
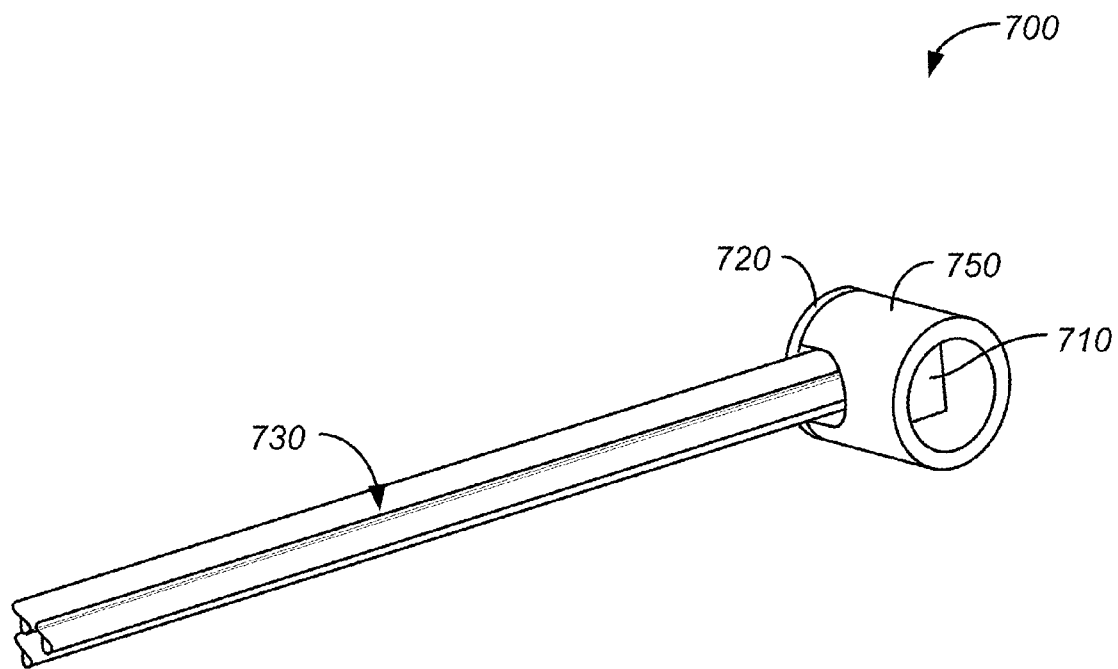
FIG. 7 shows an example of an illustration of a luminescent beam stop.

FIG. 7 shows an example of an illustration of a luminescent beam stop. The luminescent beam stop 700 shown in FIG. 7 includes a bundle of optical fibers 730. Also shown in FIG. 7 are a luminescent material 710, a beam stop plate 720, and a hollow sleeve 750. The luminescent material 710, the beam stop plate 720, and the hollow sleeve 750 may be similar to the components described above with respect to FIGS. 2A, 2B, 3, 4A-4C, and 5.

In some embodiments, the luminescent material comprises two to five individual blocks of material, or three blocks of material. For example, when a luminescent material of specified dimensions is not available, the luminescent material may be assembled from individual blocks of material. In some embodiments, each block of material has dimensions of about 250 microns to 1 mm by about 250 microns to 1 mm by about 80 microns to 350 microns. For example, each block of material may have dimensions of about 500 microns by about 500 microns by about 200 microns. In some embodiments, the blocks of material are joined to each other with an adhesive. For example, the adhesive may be a cyanoacrylate adhesive.

Figure 8A:
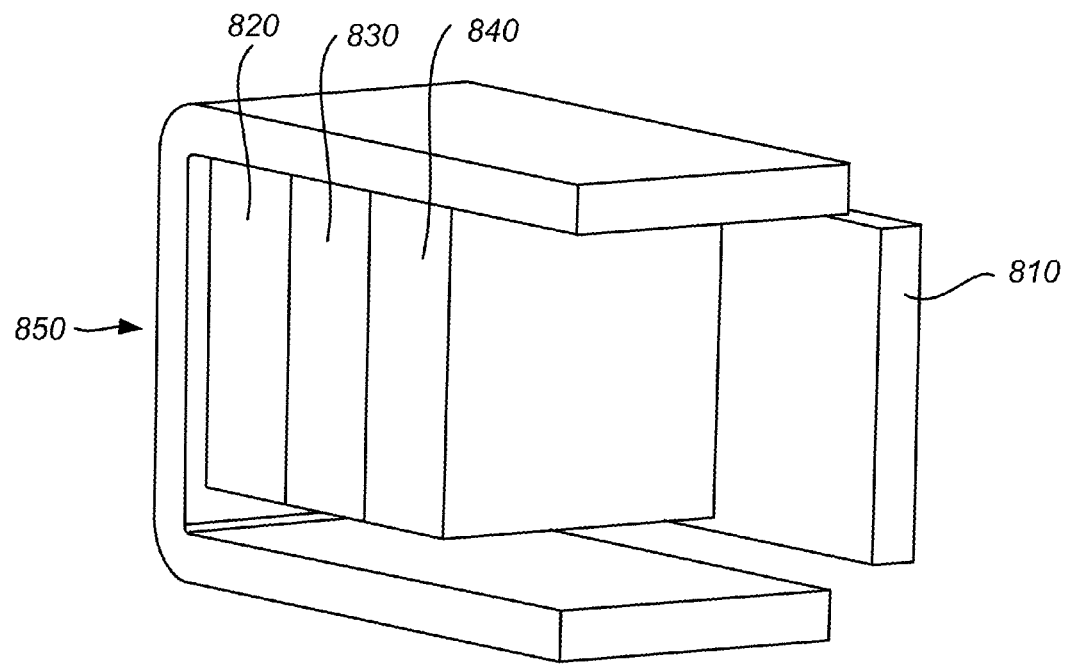
FIGS. 8A and 8B show examples of illustrations of a frame with blocks of a luminescent material disposed therein.
Figure 8B:
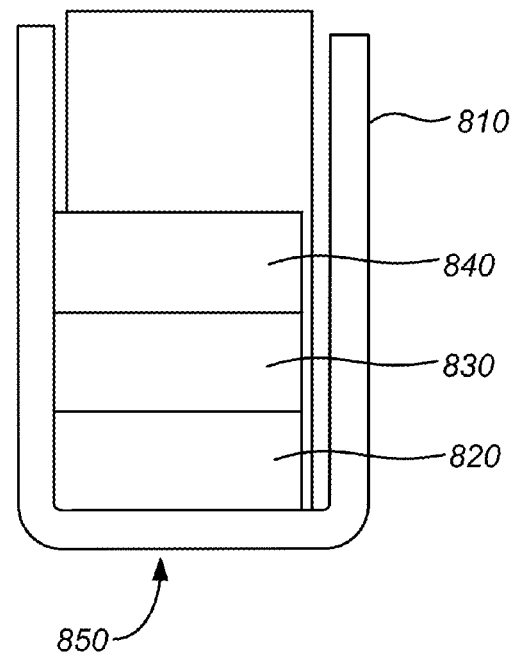

FIGS. 8A and 8B show examples of illustrations of a frame with blocks of a luminescent material disposed therein. The frame 810 shown in FIGS. 8A and 8B can be used to assemble the luminescent material from individual blocks 820, 830, and 840 of material. The frame 810 may be fabricated from a metal, such as gold, tantalum, or tungsten, for example. In some embodiments, the frame has a thickness of about 50 microns to 150 microns, or about 100 microns.

When a frame is used in a luminescent beam stop, the frame itself may absorb some of the electromagnetic radiation (e.g., x-rays). For example, the side 850 of the frame 810 can serve as the beam stop plate. In some embodiments, if the side 850 is not thick enough absorb the electromagnetic radiation, a beam stop plate is attached to the side 850 of the frame 810.

Figure 9:
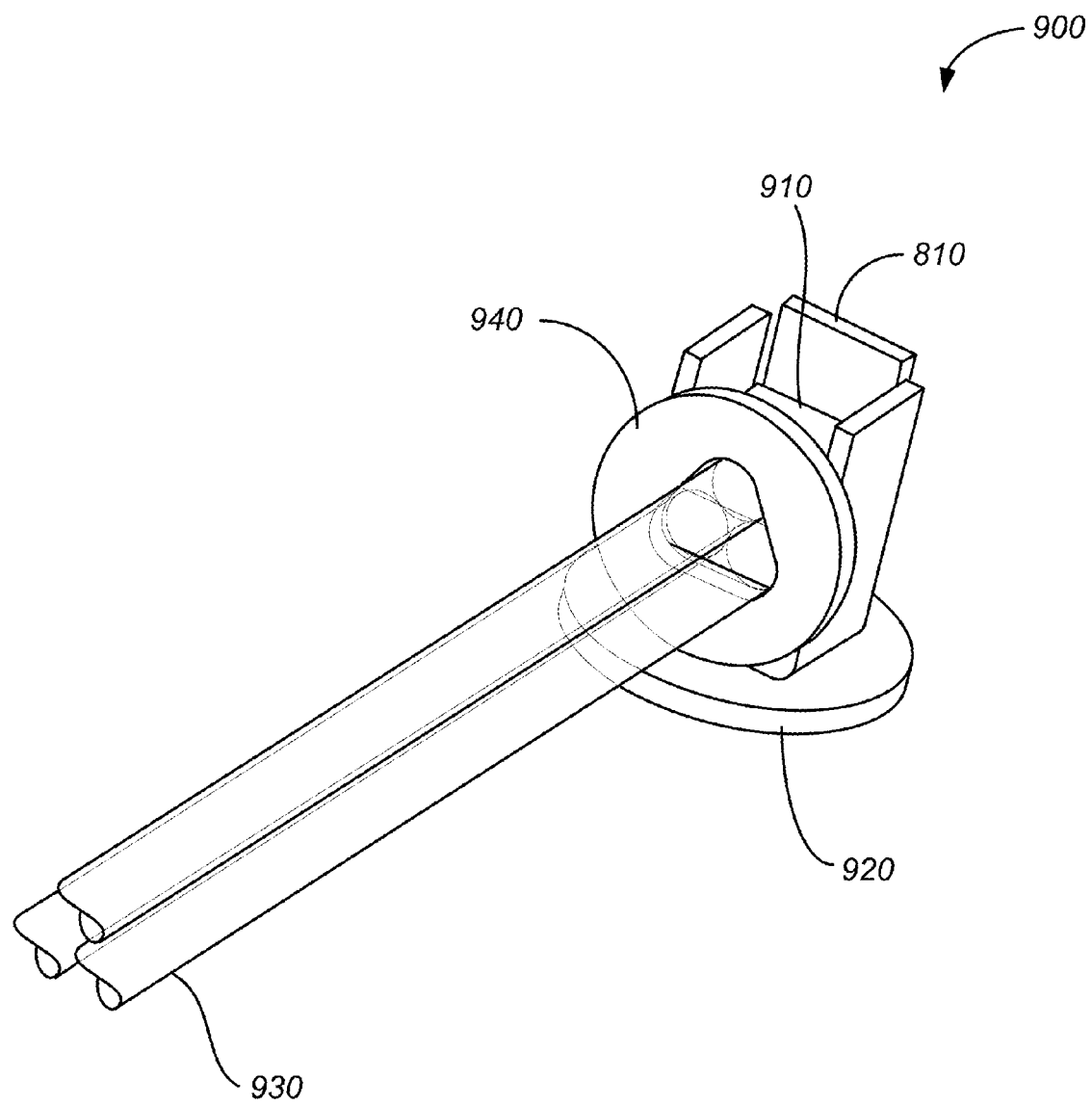
FIG. 9 shows an example of an illustration of a luminescent beam stop.

FIG. 9 shows an example of an illustration of a luminescent beam stop. The luminescent beam stop 900 shown in FIG. 9 includes the frame 810, a luminescent material 910, a beam stop plate 920, and a bundle of optical fibers 930. The luminescent material 910 includes three blocks of material. The bundle of optical fibers 930 includes three optical fibers. The luminescent beam stop 900 further includes a plate 940.

The plate 940 defines an open region, and the bundle of optical fibers 930 passes through the open region in the plate 940 before contacting the luminescent material 910. In some embodiments, the plate 940 contacts the sides of the optical fibers in the bundle of optical fibers 930. In some embodiments the plate 940 contacts the frame 810. In some embodiments, the plate 940 contacts the luminescent material 910. The plate 940 may be fabricated from the same metal as the frame 810. For example, the plate 940 may be gold, tantalum, or tungsten. In some embodiments, the plate has a thickness of about 50 microns to 150 microns, or about 100 microns. In some embodiments, the plate 940 increases the intensity of the light transmitted to the optical fiber.

While the frame 810 serves to aid in the assembly of the blocks of the luminescent material, it also may serve a similar function as the hollow sleeve 250 shown in FIGS. 2A, 2B, and 5. That is, the frame 810 may prevent electromagnetic radiation (e.g., x-rays) scattered by the luminescent material from impinging on the detector. The frame 810 may also increase the intensity of the light that is transmitted to the optical fiber.

As shown in FIGS. 8A and 8B, two sides of the blocks of luminescent material 820, 830, and 840 are in contact with the frame 810, and two sides of the blocks of material 820, 830, and 840 are not in contact with the frame 810. The block of material 820 contacts the frame 810 with three sides. Contact between the blocks of material 820, 830, and 840 and the frame 810 may increase or maximize the light that is transmitted to the optical fiber. In some embodiments, the frame 810 is fabricated so that three sides of the blocks of material 820, 830, and 840 are in contact with the frame 810. This may further increase the intensity of the light that is transmitted to the optical fiber. In some embodiments, the frame 810 is fabricated so that the plate 940 also is in contact with the blocks of material 820, 830, and 840.

In some embodiments, surfaces of the frame 810 defining gaps between the frame 810 and the blocks of luminescent material 820, 830, and 840 are coated with a reflective material. For example, the reflective material may be a white paint, a silver paint, or a gold paint. The reflective material may further increase the intensity of the light transmitted to the optical fiber.

Figure 10:
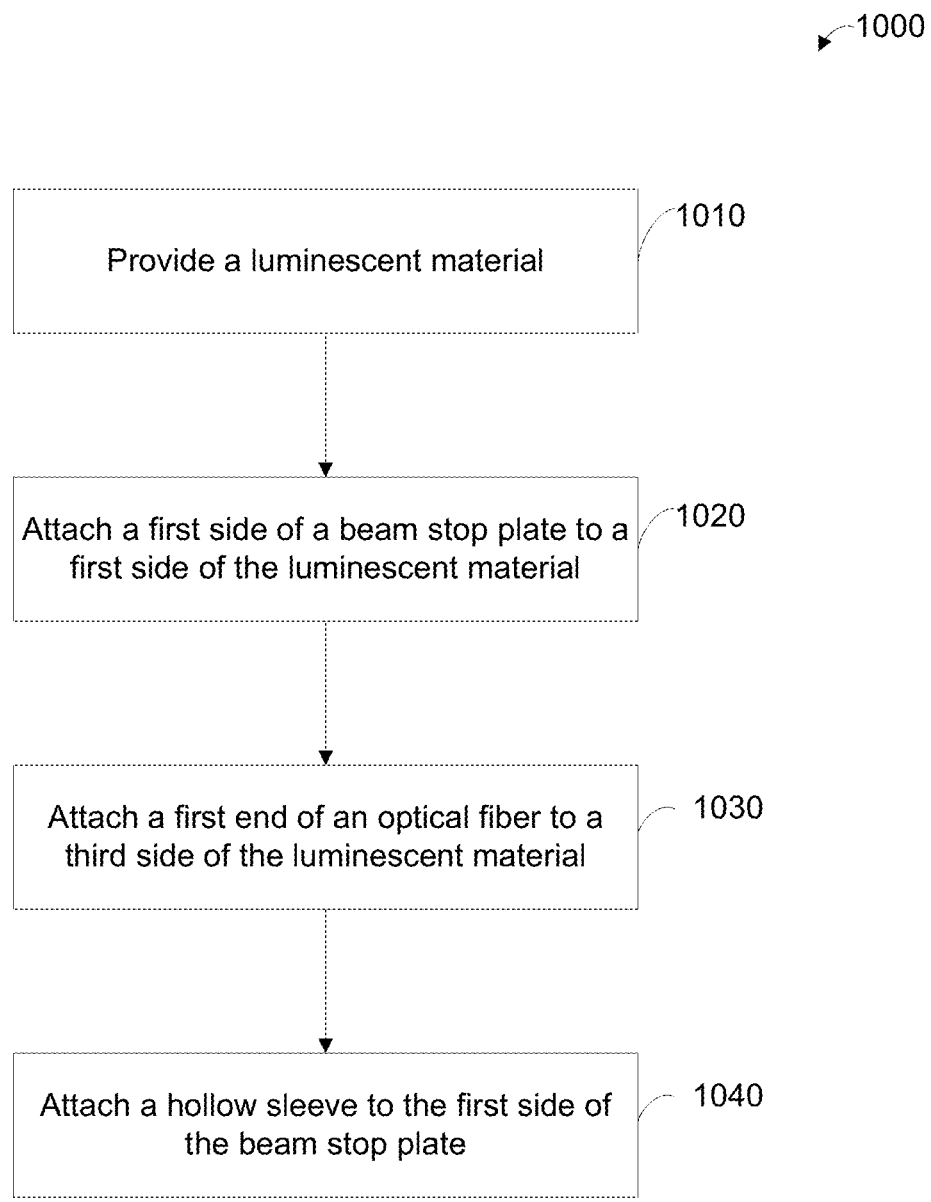
FIG. 10 shows an example of a flow diagram illustrating a manufacturing process for a luminescent beam stop.

FIG. 10 shows an example of a flow diagram illustrating a manufacturing process for a luminescent beam stop. The process shown in FIG. 10 can be used to manufacture the embodiments of a luminescent beam stop described above.

Starting at block 1010 of the method 1000, a luminescent material is provided. In some embodiments, the luminescent material is a parallelepiped having a first side and a second side that are squares and having a third side that is a rectangle or a square. The first side and the second side are perpendicular to the third side.

At block 1020, a first side of a beam stop plate is attached to the first side of the luminescent material. In some embodiments, the beam stop plate is attached to the first side of the luminescent material with an adhesive. In some embodiments, the adhesive comprises a cyanoacrylate adhesive.

At block 1030, a first end of an optical fiber is attached to the third side of the luminescent material. In some embodiments, the first end of the optical fiber is attached to the third side of the luminescent material with an optical adhesive.

At block 1040, a hollow sleeve is attached to the first side of the beam stop plate. In some embodiments, the hollow sleeve is attached to the first side of the beam stop plate with an adhesive. In some embodiments, the adhesive comprises a cyanoacrylate adhesive. In some embodiments, an interior surface of the hollow sleeve is coated with a reflective material before the hollow sleeve is attached to the first side of the beam stop plate. For example, the reflective material may be a white paint, a silver paint, or a gold paint.

In some embodiments, after block 1030, sides of the luminescent material are coated with a reflective material. In some embodiments, after block 1030, sides of the luminescent material, except the side of the luminescent material on which the electromagnetic radiation will impinge, are coated with a reflective material. For example, the reflective material may be a white paint, a silver paint, or a gold paint.

In some embodiments, a bundle of optical fibers is used instead of an optical fiber or a single optical fiber. In some embodiments, a bundle of fiber optics is assembled. Assembling the bundle of optical fibers may include, for example, stripping a plastic coating off of the optical fibers, cleaving ends of the optical fibers, and bonding a plurality of optical fibers, three optical fibers, or four optical fibers together using an adhesive. In some embodiments, the adhesive comprises a cyanoacrylate adhesive.

In some embodiments, a luminescent is assembled from blocks of a material, as described with respect to FIGS. 8A and 8B. In some embodiments, a frame is fabricated by cutting and then bending a layer or sheet of gold (e.g., work-hardened gold). A laser mill may be used to score the gold so that the gold can be folded to form the frame.

The individual blocks of the material may be cut to a specified size or sizes. For example, a laser mill may be used to cut the individual blocks of the material. After the frame is fabricated and the individual blocks of material are cut, the individual blocks of material can be positioned in the frame. An adhesive can be used to bond the individual blocks of material to the frame and to each other. In some embodiments, the adhesive comprises a cyanoacrylate adhesive.

Potential uses of the luminescent beam stop described herein include measuring the radiation dose to a sample during data collection at a beamline and monitoring the x-ray beam intensity during data collection at a beamline. The radiation dose to a sample can be used to determine a length of exposure time to the x-ray beam to generate an image and the total dose of x-rays received by a sample per image generated. The luminescent beam stop can be used to determine if an x-ray beam is present during an experiment. The luminescent beam stop also can be used to determine the x-ray beam position during an experiment.

Figure 11:
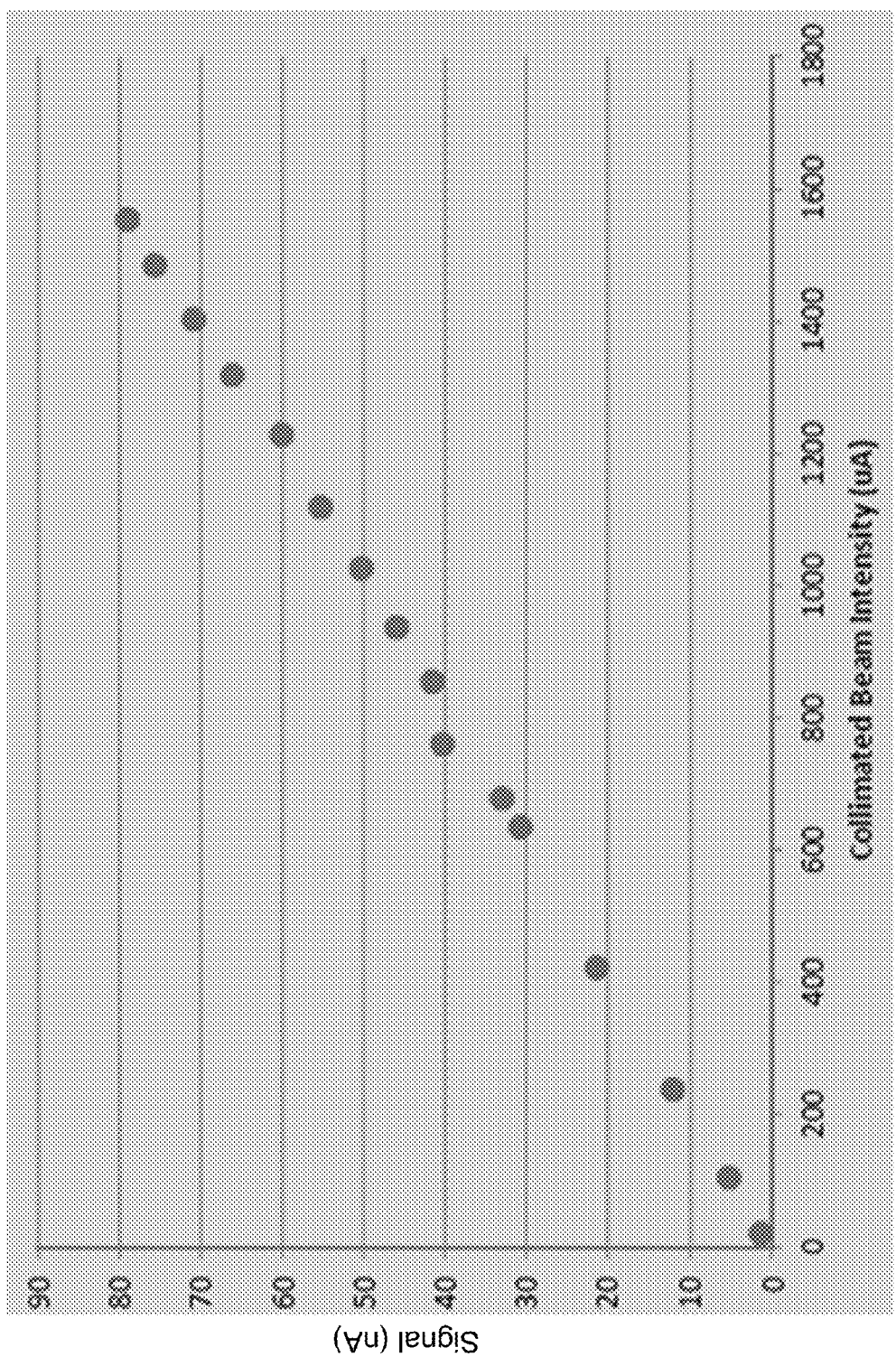
FIG. 11 shows an example of the results generated by a luminescent beam stop.

FIG. 11 shows an example of the results generated by a luminescent beam stop. In FIG. 11, the output (e.g., nano-amps) from a light sensing device attached to the end of the optical fiber of a luminescent beam stop versus the collimated beam intensity (microamps, as measured with a reference device separate from the luminescent beam stop) is plotted. As the collimated beam intensity increases, the response of the light sensing device increases linearly. The straight line indicates that the signal from the luminescent beam stop accurately reflects the intensity variations of the beam; i.e., as the beam flux increases, the signal from the luminescent beam stop increases proportionately to the intensity reading on the reference device. If the collimated beam intensity (i.e., the portion of the raw beam that hits a sample) changed by 10%, but the luminescent beam stop signal changed by significantly more or less than 10%, for example, it would mean the luminescent beam stop could not be used to accurately determine how much beam was actually being delivered to the sample.

In some embodiments, the luminescent beam stop does not completely block the unscattered electromagnetic radiation. For example, the luminescent beam stop may attenuate the unscattered electromagnetic radiation to a level that is safe for the detector. To accomplish this, in some embodiments, the luminescent beam stop does not include a beam stop plate. In some embodiments, the luminescent beam stop includes a beam stop plate comprising a material of a thickness that allows a portion of the unscattered electromagnetic radiation to pass through the beam stop plate. In some embodiments, the luminescent material comprises a material that minimally attenuates the electromagnetic radiation (e.g., diamond). In some embodiments, a thickness of the luminescent material is small so that the luminescent material minimally attenuates the electromagnetic radiation.

In some embodiments, the luminescent beam stop is used to measure the intensity of the electromagnetic radiation at an intermediate point of the beamline. For example, the luminescent beam stop could be used to measure the intensity of the electromagnetic radiation before the electromagnetic radiation interacts with the sample. To accomplish this, in some embodiments, the luminescent beam stop does not include a beam stop plate. In some embodiments, the luminescent material comprises a material that minimally attenuates the electromagnetic radiation (e.g., diamond). In some embodiments, a thickness of the luminescent material is small so that the luminescent material minimally attenuates the electromagnetic radiation.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A device comprising:
    a luminescent material, the luminescent material being a parallelepiped having a first side and a second side that are squares and having a third side that is a rectangle or a square, the first side and the second side being perpendicular to the third side;
    a beam stop plate attached to the first side of the luminescent material; and
    an optical fiber having a first end and a second end, the first end of the optical fiber attached to the third side of the luminescent material.

2. The device of claim 1, wherein the luminescent material is selected from a group consisting of cerium-doped yttrium aluminum garnet, lead tungstate, cadmium tungstate, and diamond.

3. The device of claim 1, wherein first side and the second side of the luminescent material are about 250 microns to 1 millimeter by about 250 microns to 1 millimeter, and wherein the third side of the luminescent material is about 250 microns to 1 millimeter by about 250 microns to 1 millimeter.

4. The device of claim 1, wherein the luminescent material comprises three or four blocks of material, and wherein each block of material has dimensions of about 250 microns to 1 millimeter by about 250 microns to 1 millimeter by about 80 microns to 350 microns.

5. The device of claim 1, wherein the optical fiber comprises a multi-mode optical fiber.

6. The device of claim 1, wherein the optical fiber has a circular cross section having a diameter of about 350 microns to 450 microns.

7. The device of claim 1, wherein the optical fiber has a length of about 10 centimeters to 2 meters.

8. The device of claim 1, wherein the beam stop plate comprises a metal selected from a group consisting of silver, gold, tantalum, and tungsten.

9. The device of claim 1, wherein the beam stop plate has circular shape and a diameter of about 250 microns to 2 millimeters.

10. The device of claim 1, wherein the beam stop plate has an oval shape with an about 250 micron to 2 millimeter short axis and an about 300 micron to 3 millimeter long axis.

11. The device of claim 1, wherein the beam stop plate is about 100 microns to 1 millimeter thick.

12. The device of claim 1, further comprising:
    a hollow sleeve, wherein an end of the hollow sleeve is attached to the beam stop plate, and wherein the hollow sleeve includes a cutout to allow the optical fiber to contact the luminescent material.

13. The device of claim 12, wherein the hollow sleeve comprises a metal selected from a group consisting of silver, gold, tungsten, and tantalum.

14. The device of claim 12, wherein a wall of the hollow sleeve is about 100 microns to 300 microns thick.

15. The device of claim 12, wherein the beam stop plate has a circular shape, wherein the hollow sleeve is a hollow cylinder, and wherein an outer diameter of the hollow sleeve is the same as a diameter of the beam stop plate.

16. The device of claim 1, further comprising:
    a photodiode, wherein the photodiode is attached to the second end of the optical fiber.

17. The device of claim 1, wherein the optical fiber is one of a plurality of optical fibers that form a bundle of optical fibers.

18. The device of claim 17, wherein each optical fiber of the bundle of optical fibers has a circular cross section having a diameter of about 100 microns to 300 microns.

19. A device comprising:
    a luminescent material, the luminescent material being a parallelepiped having a first side and a second side that are squares and having a third side that is a rectangle or a square, the first side and the second side being perpendicular to the third side;
    a beam stop plate attached to the first side of the luminescent material; and
    a bundle of optical fibers having a first end and a second end, the first end of the bundle of optical fibers attached to the third side of the luminescent material.

20. A method comprising:
    (a) providing a luminescent material, the luminescent material being a parallelepiped having a first side and a second side that are squares and having a third side that is a rectangle or a square, the first side and the second side being perpendicular to the third side;
    (b) attaching a beam stop plate to the first side of the luminescent material; and
    (c) attaching a first end of an optical fiber to the third side of the luminescent material.

* * * * *